US008691101B2

(12) United States Patent
Takeuchi et al.

(10) Patent No.: US 8,691,101 B2
(45) Date of Patent: Apr. 8, 2014

(54) METHOD FOR MANUFACTURING EJECTION ELEMENT SUBSTRATE

(75) Inventors: Souta Takeuchi, Fujisawa (JP); Hirokazu Komuro, Yokohama (JP); Sadayoshi Sakuma, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 13/281,714

(22) Filed: Oct. 26, 2011

(65) Prior Publication Data

US 2012/0111828 A1 May 10, 2012

(30) Foreign Application Priority Data

Nov. 5, 2010 (JP) ................................ 2010-248886

(51) Int. Cl.
*G01D 15/18* (2006.01)

(52) U.S. Cl.
USPC ............................................ 216/27; 264/400

(58) Field of Classification Search
None
See application file for complete search history.

(56) References Cited

U.S. PATENT DOCUMENTS

| | | | | |
|---|---|---|---|---|
| 5,983,486 | A * | 11/1999 | Shimomura et al. | 29/611 |
| 6,045,214 | A * | 4/2000 | Murthy et al. | 347/47 |
| 8,177,988 | B2 * | 5/2012 | Komiyama et al. | 216/17 |
| 2002/0036677 | A1 * | 3/2002 | Watanabe et al. | 347/65 |
| 2006/0066687 | A1 * | 3/2006 | Hori | 347/68 |
| 2008/0165222 | A1 * | 7/2008 | Hayakawa et al. | 347/44 |
| 2009/0065476 | A1 * | 3/2009 | Komiyama et al. | 216/41 |
| 2009/0212008 | A1 * | 8/2009 | Uyama et al. | 216/27 |
| 2011/0059558 | A1 * | 3/2011 | Takeuchi et al. | 438/21 |
| 2011/0089503 | A1 * | 4/2011 | Fujita et al. | 257/415 |
| 2011/0306158 | A1 * | 12/2011 | Tan | 438/51 |

FOREIGN PATENT DOCUMENTS

| | | |
|---|---|---|
| JP | 2006-035853 A | 2/2006 |
| JP | 2009-202401 A | 9/2009 |

* cited by examiner

*Primary Examiner* — Allan Olsen
(74) *Attorney, Agent, or Firm* — Fitzpatrick, Cella, Harper & Scinto

(57) ABSTRACT

A method for manufacturing an ejection element substrate, which is provided with a flow-channel-forming member having an ejection orifice for ejecting a liquid and a liquid flow channel that is communicated with the ejection orifice, a substrate having a supply port for supplying the liquid to the liquid flow channel, and a filter structure formed in the bottom of the supply port, includes: forming the supply port by forming a through-hole by etching the substrate from a second face of the substrate on the side opposite to a first face of the substrate, on which the flow-channel-forming member is disposed; providing a resinous protection film on the side face and the bottom of the supply port; and forming a minute opening in the resinous protection film in the bottom of the supply port by carrying out a laser processing from the side of the second face.

6 Claims, 5 Drawing Sheets

METHOD FOR MANUFACTURING EJECTION ELEMENT SUBSTRATE

BACKGROUND OF THE INVENTION

1. Field of the Invention

The present invention relates to a method for manufacturing an ejection element substrate for ejecting a liquid.

2. Description of the Related Art

The ejection element substrate of an ink jet recording head generally has an ejection orifice for ejecting an ink, an ink supply port for supplying the ink onto the ejection element substrate, and an ink flow channel which is communicated with the ink supply port and the ejection orifice, as the basic structure.

There are several parts that become important points in the manufacture of the ejection element substrate. One of the important points is a point of forming an ink flow channel by using a shape. Another one of the important points is a point of forming an ink supply port of a through-hole by etching a substrate.

The ink supply port needs to secure resistance to ink because of its contact with the ink. Because of this, a method is used which employs a crystal anisotropy etching technique for forming the ink supply port on a silicon substrate having the surface of which the crystal orientation is the (100) face. However, an ink supply port formed by this method has an angle of 54.7° with respect to the plane of the silicon substrate, and accordingly the aperture width of the ink supply port occasionally may inadvantageously be large.

As a method of solving these issues of the ink resistance and the width of the ink supply port, a method has been proposed which includes forming the supply port by using a Deep-RIE method and forming a protection film in the interior of the supply port, as is described in Japanese Patent Application Laid-Open No. 2009-202401.

In addition, as for the ink jet recording head, a means for realizing a small droplet has been proposed in recent years so as to comply with a demand of forming an image of higher quality, and an embodiment in which a filter structure is provided has been proposed as is described in Japanese Patent Application Laid-Open No. 2006-035853.

In the ink supply port having on its inner wall an organic protection film with ink resistance, if the miniaturization of a substrate is aimed at, the side wall of the ink supply port is desirably formed in a vertical direction, as is described in Japanese Patent Application Laid-Open No. 2009-202401. When it is considered that the filter structure is formed in the ink supply port by a patterning technology of photolithography, the ink supply port is to be formed from the back face, from the viewpoint that the ink flow channel is formed by the use of a shape, and the position accuracy of the ink supply port is generally determined on the basis of the back face.

However, the filter structure as illustrated in Japanese Patent Application Laid-Open No. 2006-035853 is formed by a patterning operation to be conducted from the side of the surface and accordingly, the filter structure needs to conform to the ink supply port which is formed on the basis of the back face, and in some cases, it may be difficult to align the positions of the filter structure and ink supply port with high accuracy.

Because of this, in order to form the filter structure with high accuracy, the filter structure is desirably patterned in the same way from the back face so as to conform to the configuration of the ink supply port which is formed from the back face. However, in this case, the filter structure is to be patterned relative to the configuration having a high aspect ratio, and accordingly, in the case of patterning according to the photolithography, a coverage failure may occur because a resist cannot be coated on the side wall part, even if a spray coating method advantageous for a step portion is employed. In addition, the resist tends to easily gather in the bottom part, and accordingly the resist there becomes thicker than a specified film thickness, and a patterning failure may occur in some cases. Furthermore, also in light exposure, focusing is difficult even if unmagnified exposure with a high focal depth is used, so that unnecessary reflection occurs at a step portion and an exposure failure may occur.

SUMMARY OF THE INVENTION

Accordingly, an object of the present invention is to provide a method for manufacturing an ejection element substrate, which can create a filter structure in the bottom part of a supply port that penetrates through the substrate, with high accuracy.

The present invention provides a method for manufacturing an ejection element substrate which is provided with a flow-channel-forming member having an ejection orifice for ejecting a liquid and a liquid flow channel that is communicated with the ejection orifice, and a substrate having a supply port for supplying the liquid to the liquid flow channel, and which has a filter structure formed in a bottom part of the supply port, including: (1) forming the supply port by forming a through-hole from a second face of the substrate on the side opposite to a first face of the substrate on which side the flow-channel-forming member is disposed; (2) providing a resinous protection film on the side face and the bottom of the supply port; and (3) forming a minute opening in the resinous protection film on the bottom of the supply port by carrying out a laser processing from the second face side.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The present invention relates to a method for manufacturing an ejection element substrate which is provided with a flow-channel-forming member having an ejection orifice for ejecting a liquid and a liquid flow channel that is communicated with the ejection orifice, and a substrate having a supply port for supplying the liquid to the liquid flow channel, and which has a filter structure formed in the bottom part of the supply port.

Firstly, the above described supply port is made in the substrate in such a manner that a through-hole is formed, preferably by etching the substrate by the use of a reactive ion etching technique from a second face of the substrate on the side opposite to a first face of the substrate on which the flow-channel-forming member is disposed.

Next, a resinous protection film is arranged on the side face and the bottom part of the supply port. At this time, the resinous protection film may preferably be formed by using a CVD method.

Next, a minute opening is formed in the resinous protection film on the bottom part of the supply port by carrying out a laser processing from the side of the second face.

Through the above described steps, an ejection element substrate having a filter structure formed in the bottom part of the supply port can be formed with high accuracy.

A substrate having a surface layer on the first face can be used as the substrate. The surface layer refers to a layer to be formed on the side of the surface of the substrate, and there is no particular limitation.

The surface layer includes, for instance, a shape for a liquid flow channel, an interlayer insulation film and an electroconductive layer, as will be described later.

When a substrate having the surface layer is used, the supply port can be formed by etching the substrate with the aid of a reactive ion etching technique from the second face until the etching region reaches the surface layer. Subsequently, a filter structure may be created in the bottom part by forming a resinous protection film on the side face of the supply port and on the surface layer which is exposed to the bottom part of the supply port, and forming a minute opening in the resinous protection film in the bottom part of the supply port.

The present invention will be described below with reference to embodiments and Examples. In the following description, the ink jet recording head will be described as an application example of the present invention, but the application of the present invention is not limited to this, and the present invention can be applied also to a liquid ejection head or the like in manufacturing a biochip or printing an electronic circuit. The liquid ejection head includes, for instance, a head for manufacturing a color filter, in addition to the ink jet recording head.

Figure 1:
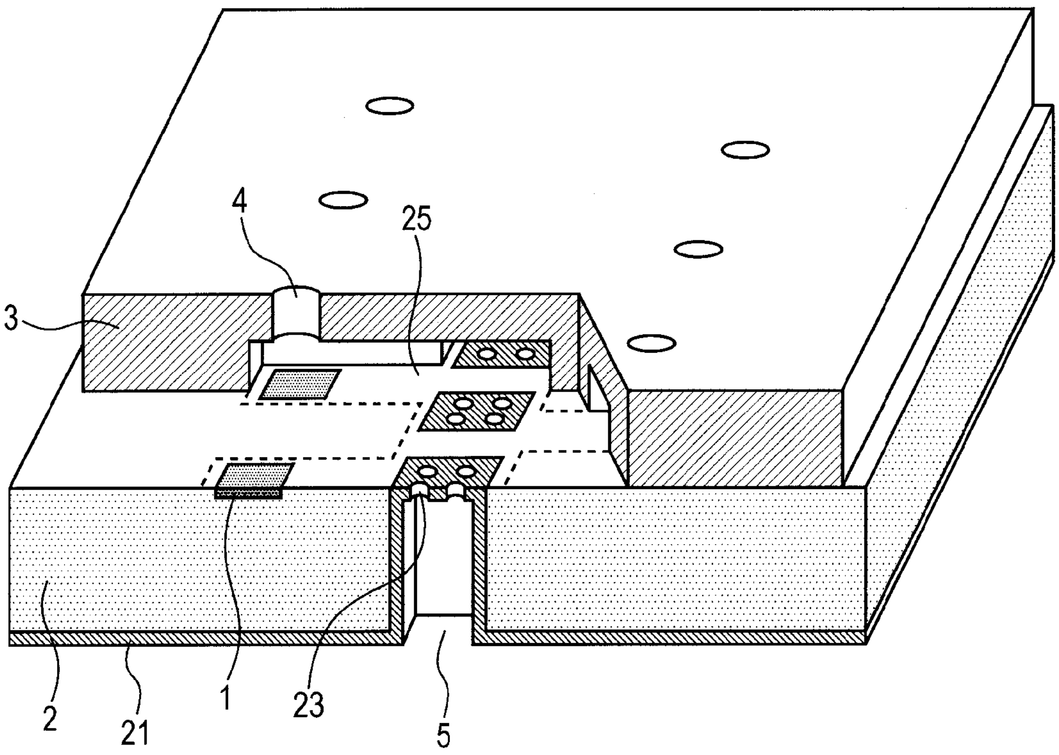
FIG. 1 is a schematic perspective view illustrating a structure of an ejection element substrate having a filter structure formed in the bottom part of a supply port.

FIG. 1 is a schematic view illustrating a structure example of an ejection element substrate obtained by the manufacturing method according to the present invention. In FIG. 1, the ejection element substrate is illustrated in the state that the ejection orifice of ink faces upward. In the present specification, the side of a face of the substrate on which the ejection orifice is provided is referred to as an upper side, and the opposite side, in other words, the side of a face of the substrate on which the ink supply port is formed is referred to as a lower side.

In FIG. 1, an ejection element substrate includes a substrate 2, and a flow-channel-forming member 3 formed on the substrate 2. The flow-channel-forming member 3 has an ink ejection orifice 4 in the upper face and forms an ink flow channel 25 which is communicated with the ink ejection orifice 4, in cooperation with the substrate 2. The substrate 2 has an ink supply port 5 as a through-hole for supplying the ink to the ink flow channel 25. The side wall of the ink supply port 5 is formed almost perpendicularly to the face of the substrate. A resin member 21 having a minute opening is provided in the aperture of the ink supply port 5 on its side, on which the flow-channel-forming member 3 is disposed, and the resin member 21 having this minute opening functions as a filter and can remove impurities contained in the ink. The resin member 21 is also provided on the side wall of the ink supply port 5 and on the rear face of the substrate 2. In the present specification, the face the substrate 2 on the side on which the flow-channel-forming member is disposed is referred to as a surface (referred to as a first face as well), and the face of the substrate 2 on the side opposite to the face of the substrate 2 on which the flow-channel-forming member is disposed is referred to as a back face (referred to as a second face as well).

An ink jet recording head provided with the ejection element substrate ejects ink from the ink ejection orifice 4 by using energy generated from an energy-generating element 1, so that the ink is deposited on a recording medium, thereby carrying out printing. The ink flows into the ejection element substrate from the ink supply port 5, passes through the ink flow channel 25 and reaches the ink ejection orifice 4.

FIGS. 2A, 2B, 2C, 2D, 2E, 2F, 2G and 2H are sectional views in steps for describing a method for manufacturing an ejection element substrate according to the present embodiment. The method for manufacturing the ejection element substrate according to the present embodiment will be described below with reference to FIGS. 2A to 2H.

Figure 2A:
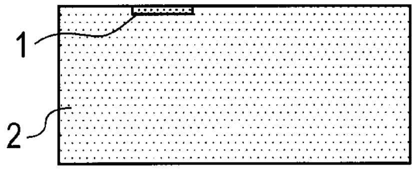
FIGS. 2A, 2B, 2C, 2D, 2E, 2F, 2G and 2H are schematic views illustrating a manufacturing method in a first embodiment.

Firstly, as is illustrated in FIG. 2A, a substrate 2 having an energy-generating element 1 is prepared.

Specifically, the substrate 2 can be obtained by forming a semiconductor element on a silicon substrate 2 in the same manner as in a general semiconductor device manufacturing process and forming the energy-generating element 1 through a multilayer wiring technology using photolithography.

Figure 2B:
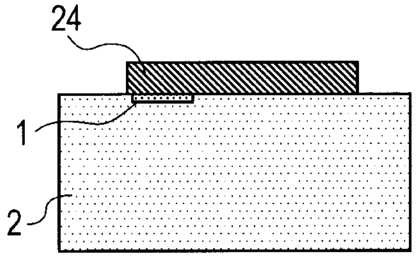

Next, as is illustrated in FIG. 2B, a shape 24 for the ink flow channel is formed as the above described surface layer. This shape 24 is eventually removed, and accordingly an appropriate material is selected with a view to removal.

Figure 2C:
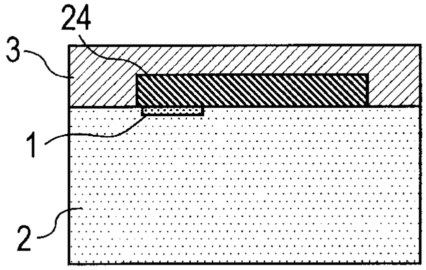

Next, as is illustrated in FIG. 2C, a flow-channel-forming member 3 is applied onto the shape 24.

Figure 2D:
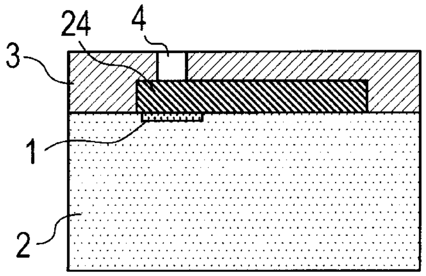

Next, as is illustrated in FIG. 2D, an ink ejection orifice 4 is formed in the flow-channel-forming member 3 by using photolithography.

Figure 2E:
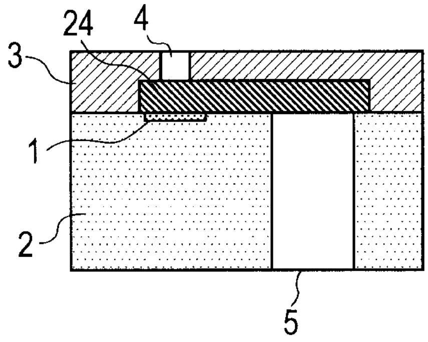

Next, as is illustrated in FIG. 2E, an ink supply port 5 is formed in the substrate 2 by carrying out an RIE (reactive ion etching) method from the back face of the substrate 2. The RIE method may preferably be a Deep-RIE by which the etching and film forming are alternately carried out using an $SF_6$ gas and $C_4F_8$ gas as the etching gas. The ink supply port 5 is formed so as to penetrate the substrate.

Figure 2F:
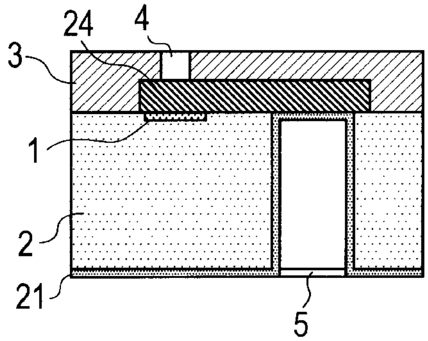

Next, as is illustrated in FIG. 2F, a resinous protection film 21 is formed on the whole back face of the substrate 2 including the side face and the bottom face of the ink supply port 5. An organic CVD technique can be used as a method for forming the resinous protection film 21. This resinous protection film 21 can impart adequate ink resistance to the ink supply port 5.

The resinous protection film can be formed by using at least one compound selected from the group consisting of a polyparaxylylene resin including polyparaxylylene, polymonochloroparaxylylene, polydichloroparaxylylene, polytetrafluoroparaxylylene and a polyparaxylylene derivative, a polyurea resin and a polyimide resin, and by making use of a CVD method. Thereby, the resin film can be adequately formed on the side face and the bottom part of the supply port having a high aspect ratio.

Figure 2G:
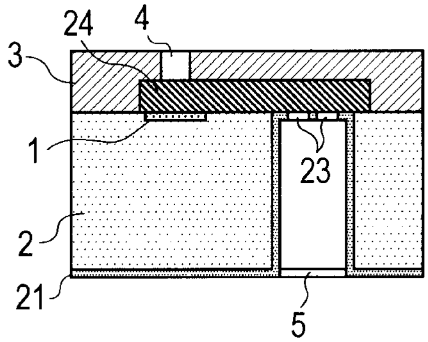

Next, as is illustrated in FIG. 2G, in order to form a filter structure in the bottom part of the ink supply port 5, a hole (minute opening) 23 is formed by a laser processing in the resinous protection film 21 which has been formed on the bottom part of the ink supply port 5.

The laser processing to be used at this time can employ a patterning technique by direct drawing to selectively remove only the resinous protection film 21.

Figure 2H:
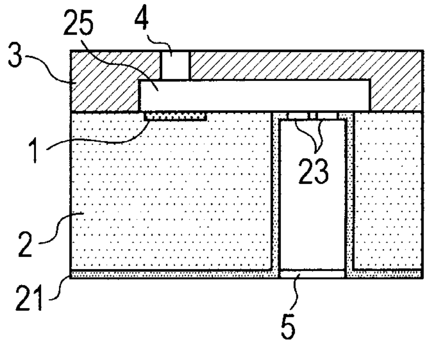

Then, as is illustrated in FIG. 2H, the shape 24 is dissolved and removed, and consequently the ink flow channel 25 is formed.

By the above described method, the ejection element substrate, which has a filter structure formed in the bottom part of the supply port, can be manufactured.

The present invention will be described below with reference to Examples. However, the present invention is not limited to the following Examples.

EXAMPLE 1

FIGS. 2A, 2B, 2C, 2D, 2E, 2F, 2G and 2H are views illustrating one example of methods for manufacturing an ejection element substrate according to a first embodiment of the invention. The one example will be described below with reference to FIGS. 2A to 2H.

As is illustrated in FIG. 2A, a heater was formed on a silicon substrate with a thickness of 200 μm, and consequently a substrate 2 having an energy-generating element 1 was prepared.

Next, as is illustrated in FIG. 2B, a shape 24 was formed by a gold plating process.

Next, as is illustrated in FIG. 2C, a flow-channel-forming member 3 was formed by spin-coating a cation polymerization type epoxy resin onto the substrate 2 and the shape 24.

Next, as is illustrated in FIG. 2D, an ink ejection orifice 4 was formed in the flow-channel-forming member 3 through an exposing step and a developing step.

Next, as is illustrated in FIG. 2E, an ink supply port 5 was formed by carrying out a Deep-RIE process, which uses $SF_6$ gas and $C_4F_8$ gas as an etching gas and alternately conducts etching and film formation, from the back face of the substrate 2.

Next, as is illustrated in FIG. 2F, a resinous protection film 21 which had a thickness of 2 μm and was formed from polyparaxylylene was provided on the back face of the substrate including the side face and the bottom face of the ink supply port, by carrying out an organic CVD process.

The organic CVD film has an adequate film thickness distribution, and achieves adequate coverage even in the ink supply port having a high aspect ratio (substrate thickness: 200 μm, and aperture dimension: 50×50 μm).

Next, as is illustrated in FIG. 2G, four holes (minute openings) 23 were formed in the bottom part of every ink supply port by carrying out a laser processing so that the corresponding part of the resinous protection film 21 formed a filter structure in the ink supply port 5.

In this laser processing, a pulse laser with a pulse of 1 μs or less can be used. As a result of the investigation, it was confirmed that, by using such a laser, the shape of the opening formed by removing a part of the resinous protection film could be made sharp and appropriate, and the opening could be selectively formed in such a way as not to damage the shape 24. Furthermore, a laser having a wavelength shorter than that of a visible light can be used, from such a viewpoint. In other words, the laser to be used in the laser processing can be a pulse laser with a pulse of 1 μs or less and with a wavelength shorter than that of a visible light. More specifically, the laser may be a pulse laser with a pulse of 1 μs or less. When polyparaxylylene is processed, a light having a wavelength of 380 nm or less, and particularly a wavelength of 200 to 270 nm may be used.

In the present Example, a minute opening having a diameter of 10 μm was formed with an excimer laser (wavelength: 248 nm, pulse width: 30 ns, and energy density: 0.6 $J/cm^2$) which was a pulse laser of ultraviolet light. At this time, the resinous protection film 21 was 2 μm in thickness, and a desired thickness of the resinous film was removed by repeating the shot of irradiation with the laser.

Next, as is illustrated in FIG. 2H, an ink flow channel 25 was formed by dissolving and removing the shape 24 of a gold plating film, which had been previously formed, with an etching liquid containing iodine and potassium iodide.

The ejection element substrate was thus manufactured by the above described method.

EXAMPLE 2

FIGS. 3A, 3B, 3C, 3D, 3E, 3F, 3G, 3H and 3I are views illustrating one example of methods for manufacturing an ejection element substrate according to a second embodiment of the invention. The example will be described below with reference to FIGS. 3A to 3I.

Figure 3A:
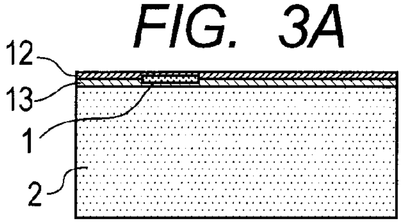
FIGS. 3A, 3B, 3C, 3D, 3E, 3F, 3G, 3H and 3I are schematic views illustrating a manufacturing method in a second embodiment.

As is illustrated in FIG. 3A, a heater was formed on a silicon substrate having a thickness of 200 μm, and an energy-generating element 1 was formed. Simultaneously, an interlayer insulation film 13 for a multilayer wiring layer and an upper protection film 12 for the multilayer wiring layer were also formed on a substrate 2 by a plasma CVD technique. The interlayer insulation film 13 is a silicon oxide film with a thickness of 1 μm, and the upper protection film 12 is a silicon nitride film with a thickness of 0.5 μm. In the present Example, the interlayer insulation film corresponds to the above described surface layer.

The interlayer insulation film may comprise at least one compound selected from the group consisting of silicon oxide, silicon nitride and silicon carbide, for instance.

Figure 3B:
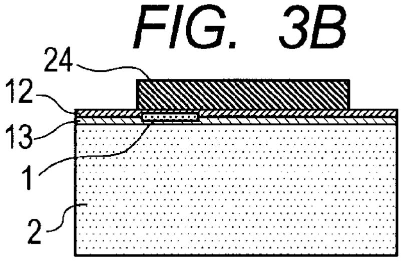

Next, as is illustrated in FIG. 3B, a shape 24 was formed. As for the method, the shape 24 was formed by spin-coating polymethyl isopropenyl ketone (trade name: ODUR-1010 made by Tokyo Ohka Kogyo Co., Ltd.) which was a dissolvable resin, and patterning the spin-coated resin through an exposing step and a developing step.

Figure 3C:
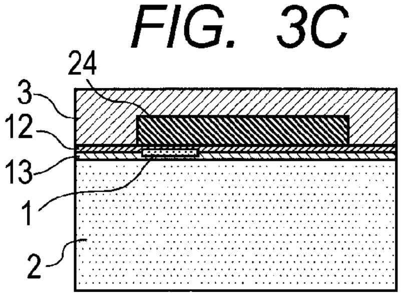

Next, as is illustrated in FIG. 3C, a flow-channel-forming member 3 was formed by spin-coating a cation polymerization type epoxy resin onto the substrate 2 and the shape 24.

Figure 3D:
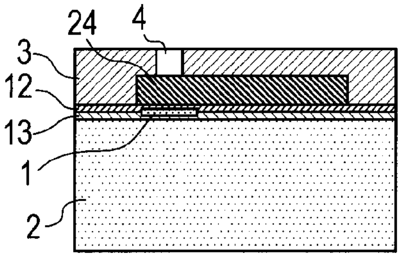

Next, as is illustrated in FIG. 3D, an ink ejection orifice 4 was formed in the flow-channel-forming member 3 through an exposing step and a developing step.

Figure 3E:
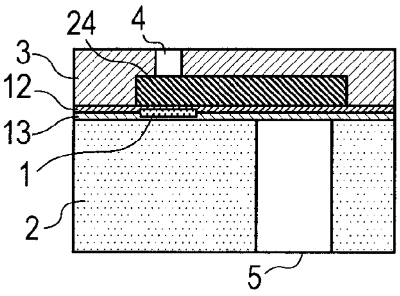

Next, as is illustrated in FIG. 3E, an ink supply port 5 was formed by carrying out a Deep-RIE method, which uses $SF_6$ gas and $C_4F_8$ gas as an etching gas and alternately conducts etching and film formation, from the back face of the substrate 2.

The etching operation was stopped with the interlayer insulation film 13 left unetched. Here, the etching reaction was discontinued by using a difference in materials between the silicon substrate and the silicon oxide film.

Figure 3F:
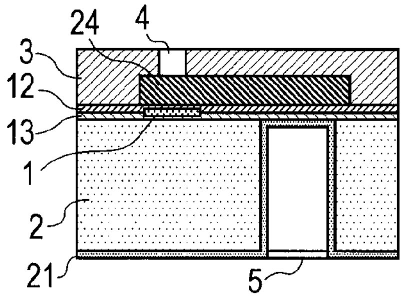

Next, as is illustrated in FIG. 3F, a resinous protection film 21 which had a thickness of 2 μm and was formed from polyparaxylylene was formed on the whole back face of the substrate including the side face and the bottom face of the ink supply port 5, by carrying out a CVD method.

The organic CVD film has an adequate film thickness distribution, and achieves adequate coverage even in the ink supply port having a high aspect ratio (substrate thickness: 200 μm, and aperture dimension: 50×50 μm).

Figure 3G:
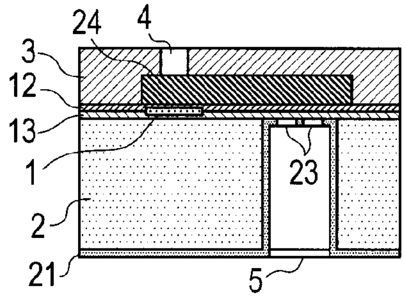

Next, as is illustrated in FIG. 3G, four holes (minute openings) 23 were formed in the bottom part of every ink supply port by carrying out a laser processing so that a filter structure for the ink supply port 5 was formed in a corresponding part of the resinous protection film 21.

In this step, it was confirmed that, by using a laser which was a pulse laser with a pulse of 1 μs or less and with a wavelength shorter than that of the visible light, the shape of the minute opening could be made sharp and the resinous protection film could be selectively removed in such a way as not to damage the interlayer insulation film 13.

In the present Example, a minute opening having a diameter of 10 μm was formed by using an excimer laser (wavelength: 248 nm, pulse width: 30 ns, and energy density: 0.6 $J/cm^2$) which was a pulse laser of ultraviolet light. At this time, the resinous protection film 21 was 2 μm in thickness, and a desired thickness of the resinous film was removed by repeating the shot of irradiation with the laser.

Figure 3H:
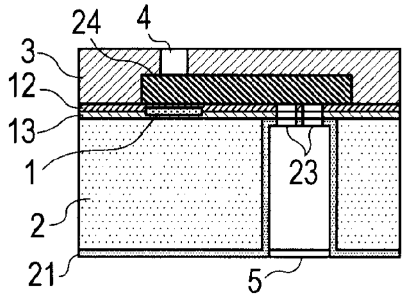

Next, as is illustrated in FIG. 3H, the interlayer insulation film 13 and upper protection film 12 were etched from the back face of the substrate by carrying out a dry etching using an RIE method which uses a gas containing $CF_4$ gas as a main component, while employing the resinous protection film 21 having the minute opening 23 therein as a contact mask. The etching region reached the shape 24, and as a result, a through-hole was formed in the interlayer insulation film 13 and the upper protection film 12.

Figure 3I:
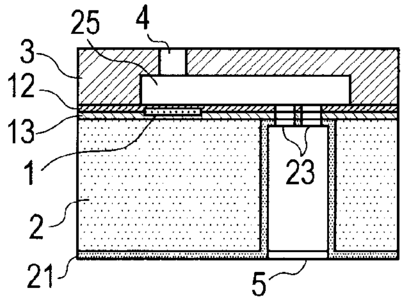

Next, as is illustrated in FIG. 3I, an ink flow channel 25 was formed by dissolving and removing the shape which had been previously formed from a dissolvable resin, with a photoresist-stripping liquid containing methyl lactate.

The ejection element substrate was manufactured with the above described method.

EXAMPLE 3

FIGS. 4A, 4B, 4C, 4D, 4E, 4F, 4G, 4H and 4I are views illustrating one example of methods for manufacturing an ejection element substrate according to a third embodiment of the invention. The example will be described below with reference to FIGS. 4A to 4I, but points different from those in Example 2 will be mainly described.

The steps of FIGS. 4A to 4G are the same as those of FIGS. 3A to 3G in Example 2, and the description will be omitted.

Figure 4A:
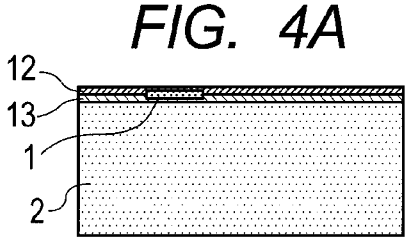
FIGS. 4A, 4B, 4C, 4D, 4E, 4F, 4G, 4H and 4I are schematic views illustrating a manufacturing method in a third embodiment.
Figure 4B:
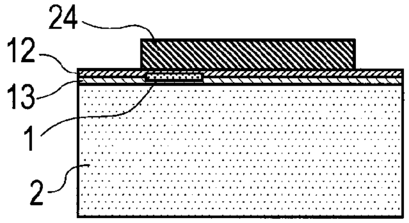
Figure 4C:
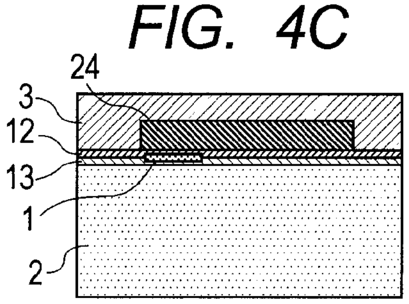
Figure 4D:
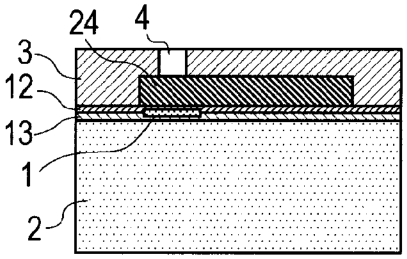
Figure 4E:
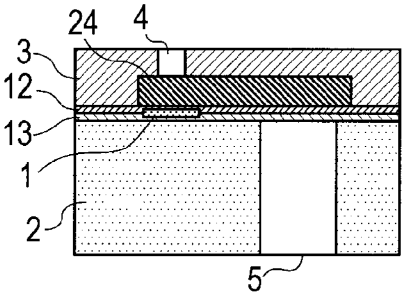
Figure 4F:
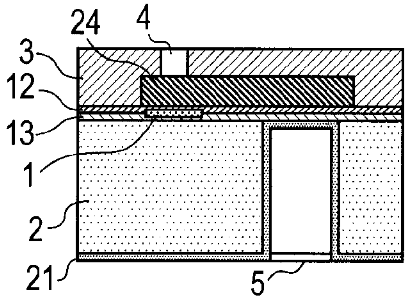
Figure 4G:
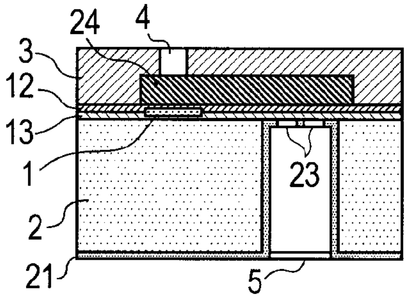
Figure 4H:
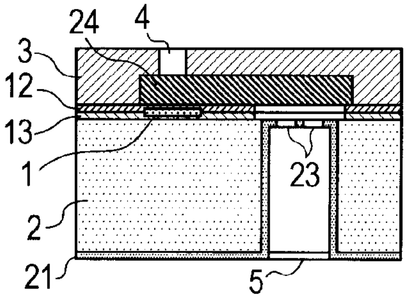

In the present Example, as is illustrated in FIG. 4H, the interlayer insulation film 13 and the upper protection film 12 were removed not by a dry etching process but by a wet etching process.

Specifically, the interlayer insulation film 13 and the upper protection film 12 were removed by carrying out a wet etching from the back face of the substrate with the use of $NH_4F$ (ammonium fluoride), by infiltrating the etchant into the films from the minute opening 23.

Figure 4I:
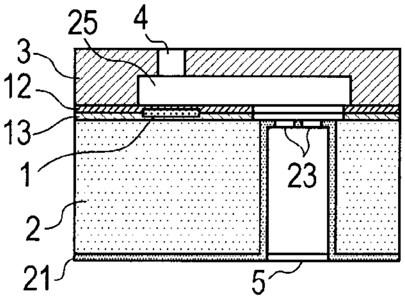

Next, as is illustrated in FIG. 4I, an ink flow channel 25 was formed by dissolving and removing the shape which had been previously formed from a dissolvable resin, with a photoresist-stripping liquid containing methyl lactate.

The ejection element substrate was thus manufactured by the above described method.

EXAMPLE 4

FIGS. 5A, 5B, 5C, 5D, 5E, 5F, 5G, 5H and 5I are views illustrating one example of methods for manufacturing an ejection element substrate according to a fourth embodiment of the invention. The one example will be described below with reference to FIGS. 5A to 5I.

Figure 5A:
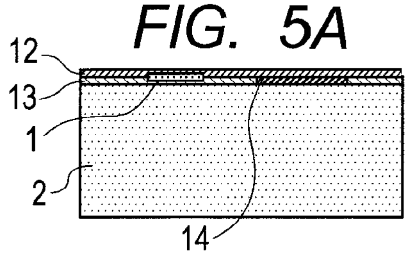
FIGS. 5A, 5B, 5C, 5D, 5E, 5F, 5G, 5H and 5I are schematic views illustrating a manufacturing method in a fourth embodiment.

As is illustrated in FIG. 5A, a heater was provided on a silicon substrate having a thickness of 200 μm, and consequently an energy-generating element 1 was formed. A metal thin film which became an electroconductive layer 14, had a thickness of 0.5 μm and was made of aluminum was also formed on a substrate 2 in a region corresponding to the position at which a supply port was to be formed. Simultaneously, an interlayer insulation film 13 for a multilayer wiring layer and an upper protection film 12 for the multilayer wiring layer were also formed on the substrate 2, by using a plasma CVD technique. The interlayer insulation film 13 is a silicon oxide film with a thickness of 1 μm, and the upper protection film 12 is a silicon nitride film with a thickness of 0.5 μm. In the present Example, the electroconductive layer is the above described surface layer.

Figure 5B:
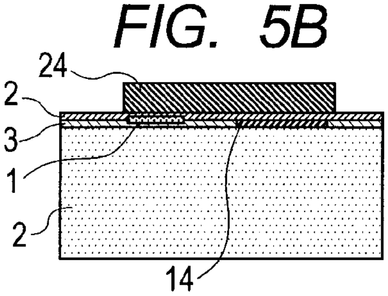

Next, as is illustrated in FIG. 5B, a shape 24 was formed. As for the method, the shape 24 was formed by spin-coating polymethyl isopropenyl ketone (trade name: ODUR-1010 made by Tokyo Ohka Kogyo Co., Ltd.) which was a dissolvable resin and patterning the spin-coated resin through an exposing step and a developing step.

Figure 5C:
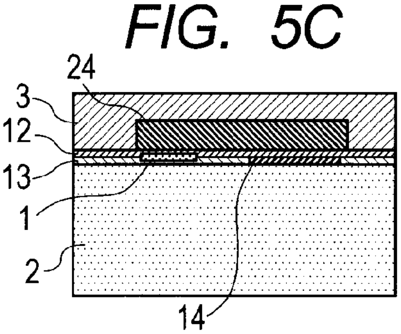

Next, as is illustrated in FIG. 5C, a flow-channel-forming member 3 was formed by spin-coating a cation polymerization type epoxy resin onto the substrate 2 and the shape 24.

Figure 5D:
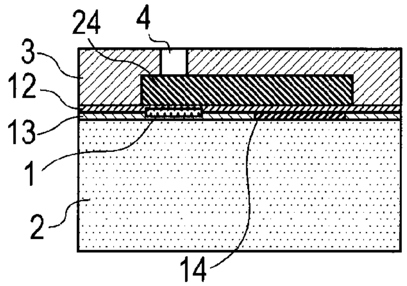

Next, as is illustrated in FIG. 5D, an ink ejection orifice 4 was formed in the flow-channel-forming member 3 through an exposing step and a developing step.

Figure 5E:
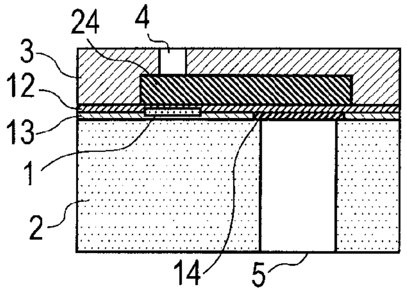

Next, as is illustrated in FIG. 5E, an ink supply port 5 was formed by carrying out a Deep-RIE method, which uses $SF_6$ gas and $C_4F_8$ gas as an etching gas and alternately conducts etching and film formation, from the back face of the substrate 2.

The etching operation was stopped with the electroconductive layer 14 on the substrate left unetched. Here, the etching reaction was stopped by using a difference in materials between the silicon substrate and the metal thin film.

At this time, the electroconductive layer 14 works to suppress the occurrence of a notching phenomenon which is seen when the substrate is etched by a Deep-RIE, because of the layer having a function of releasing electrostatic charges due to the RIE method. Usable material for electroconductive layer 14 includes, for instance, aluminum silicon (Al/Si), aluminum copper (Al/Cu) and aluminum silicon copper (Al/Si/Cu), in addition to aluminum.

Figure 5F:
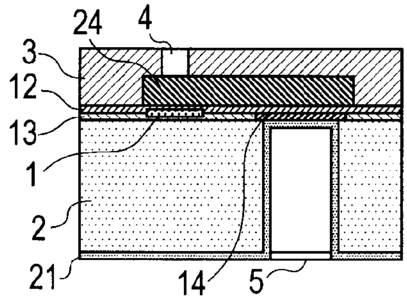

Next, as is illustrated in FIG. 5F, a resinous protection film 21 which had a thickness of 2 μm and was formed from polyparaxylylene was provided on the whole back face of the substrate including the side face and the bottom face of the ink supply port 5, by an organic CVD technique.

The organic CVD film has adequate film thickness distribution, and achieves adequate coverage even in the ink supply port having a high aspect ratio (substrate thickness: 200 μm, and aperture dimension: 50×50 μm).

Figure 5G:
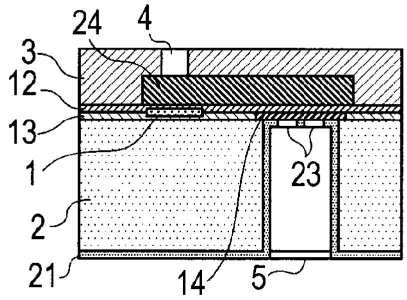

Next, as is illustrated in FIG. 5G, four minute openings 23 were formed in the bottom part of each ink supply port by carrying out a laser processing so that a filter structure for the ink supply port 5 was formed in the corresponding region of the resinous protection film 21.

In this step, it was confirmed that, by using a laser which was a pulse laser with a pulse of 1 μs or less and with a wavelength shorter than that of visible light, the shape of the minute opening was made sharp and the resinous protection film could be selectively removed in such a way as not to damage the electroconductive layer 14.

In the present Example, a minute opening having a diameter of 10 μm was formed by using an excimer laser (wavelength: 248 nm, pulse width: 30 ns, and energy density: 0.6 $J/cm^2$) which was a pulse laser of ultraviolet light. At this time, the resinous protection film 21 was 2 μm in thickness, and a desired thickness of the resinous film was removed by repeating the shot of irradiation with the laser.

Figure 5H:
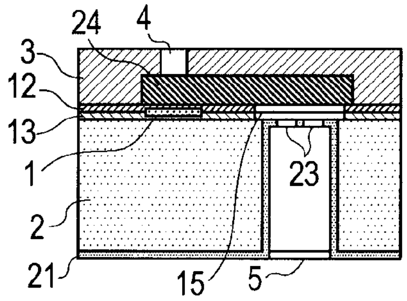

Next, as is illustrated in FIG. 5H, the electroconductive layer 14 which was a metal thin film and the upper protection film 12 which was a silicon nitride film were removed by carrying out a wet etching from the back face of the substrate with the aid of $NH_4F$ (ammonium fluoride), by infiltrating the etchant into the films from the minute opening 23. Thereby, the electroconductive layer 14 was removed, and only the resinous protection film 21 was left as a part constituting the filter structure. In FIG. 5H, an electroconductive layer removal part 15 is illustrated from which the electroconductive layer has been removed.

Figure 5I:
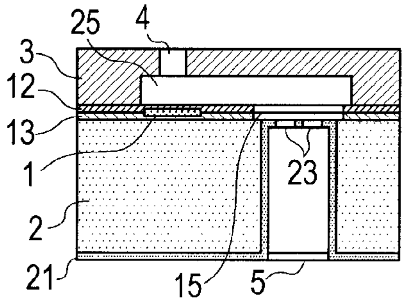

Next, as is illustrated in FIG. 5I, an ink flow channel 25 was formed by dissolving and removing the shape which had been previously formed from a dissolvable resin, with a photoresist-stripping liquid containing methyl lactate.

The ejection element substrate was thus manufactured with the above described method.

According to the present invention, a filter structure for achieving a high image quality can be formed with high accuracy, and an ejection element substrate can be miniaturized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-248886, filed Nov. 5, 2010, which is hereby incorporated by reference herein in its entirety.

What is claimed is:

1. A method for manufacturing an ejection element substrate which is provided with a flow-channel-forming member having an ejection orifice for ejecting a liquid and a liquid flow channel that is communicated with the ejection orifice, and a substrate having a supply port for supplying the liquid to the liquid flow channel, and which has a filter structure formed in a bottom of the supply port, comprising the steps of:

(1) forming the supply port by forming a through-hole from a second face of the substrate on the side opposite to a first face of the substrate on which the flow-channel-forming member is disposed;

(2) providing a resinous protection film on a side face and the bottom of the supply port, the bottom being an end adjacent to the flow-channel-forming member; and (3) forming an opening in the resinous protection film on the bottom of the supply port by carrying out a laser processing from the side of the second face, wherein in the step (1), the substrate has a surface layer on the first face and the substrate is removed from the second face until the surface layer is reached, in the step (2), the resinous protection film is provided on the side face of the supply port and on the surface layer which is exposed at the bottom of the supply port, and wherein the surface layer is in the form of a shape for defining the liquid flow channel, and is formed of a dissolvable material.

2. The method for manufacturing the ejection element substrate according to claim 1, wherein in the step (1), the substrate is etched to form the through-hole by carrying out a reactive ion etching until the etching reaches the surface layer from the second face.

3. The method for manufacturing the ejection element substrate according to claim 2, wherein the reactive ion etching is a method which uses a process of alternately conducting etching and film formation.

4. The method for manufacturing the ejection element substrate according to claim 1, wherein the resinous protection film is formed by using at least one compound selected from the group consisting of a polyparaxylylene resin including at least one of polyparaxylylene, polymonochloroparaxylylene, polydichloroparaxylylene, polytetrafluoroparaxylylene and a polyparaxylylene derivative, a polyurea resin and a polyimide resin, and by the use of a CVD method.

5. The method for manufacturing the ejection element substrate according to claim 1, wherein the laser processing employs a pulse laser with a pulse of 1 μs or less.

6. The method for manufacturing the ejection element substrate according to claim 5, wherein the laser processing employs a laser having a shorter wavelength than that of a visible light.

* * * * *